United States Patent [19]

Nakagaki et al.

[11] Patent Number: 5,367,329

[45] Date of Patent: Nov. 22, 1994

[54] ACCOUNTING SYSTEM IN NETWORK FOR OFFERING VIDEO PROGRAMS

[75] Inventors: Tatsuru Nakagaki; Toshimasa Fukui, both of Kawasaki, Japan

[73] Assignee: Fujitsu Limited, Kawasaki, Japan

[21] Appl. No.: 967,626

[22] Filed: Oct. 23, 1992

[30] Foreign Application Priority Data

Oct. 24, 1991 [JP] Japan ................................. 3-277544

[51] Int. Cl.⁵ ........................ H04N 7/16; H04N 7/173
[52] U.S. Cl. ............................................. 348/1; 455/2
[58] Field of Search .............. 358/84, 86; 455/2, 6.1, 455/6.2; 348/1, 3, 10, 12; H04N 7/16, 7/173

[56] References Cited

U.S. PATENT DOCUMENTS

| | | | |
|---|---|---|---|
| 4,759,060 | 7/1988 | Hayashi | 358/84 |
| 5,065,393 | 11/1991 | Sibbih | 358/84 |
| 5,105,268 | 4/1992 | Yamanouchi | 358/86 |

FOREIGN PATENT DOCUMENTS

| | | | |
|---|---|---|---|
| 289784 | 12/1986 | Japan | H04N 7/16 |
| 88983 | 4/1988 | Japan | H04N 7/16 |
| 123294 | 5/1988 | Japan | H04N 7/16 |
| 199978 | 8/1990 | Japan | H04N 7/16 |

*Primary Examiner*—Mark R. Powell
*Assistant Examiner*—Chris Grant

[57] ABSTRACT

In an accounting system in a B-ISDN offering video programs to a plurality of subscriber terminals coupled thereto, a timer, and an account controller are provided in each of the subscriber terminals. The timer starts to count time when a subscriber terminal receives a video program offered from the network. The account controller determines whether or not a count time in the timer has reached n sec. (e.g. 300 sec.), and transmits account starting information to the network when it is determined the count time in the timer has reached n sec.. The account controller also transmits account termination information to the network when the subscriber terminal discontinues receipt of the video program. The network is provided with an accounting unit for performing a accounting process with respect to each of the subscriber terminals from which the account starting information and the account termination information are transmitted, the accounting process starting from a time at which the network receives the account starting information to a time at which the network receives the account termination information.

17 Claims, 10 Drawing Sheets

1: ACCOUNTING
0: NOT ACCOUNTING

ACCOUNTING SYSTEM IN NETWORK FOR OFFERING VIDEO PROGRAMS

BACKGROUND OF THE INVENTION

(1) Field of the Invention

The present invention relates to an accounting system in a network, such as a B-ISDN (Broad band Integrated Services Digital Network), for offering video programs.

(2) Description of Related Art

Recently, a B-ISDN has been studied actively. As the B-ISDN has broad band characteristics, using the B-ISDN for offering video programs in, for example, CATV (Cable Television) service is a promising pursuit.

In a conventional CATV service, an accounting system as shown in FIG. 1 is used. Referring to FIG. 1, a plurality of CATV terminals 44a, 44b and 44c are coupled to a network 40 by coaxial cables, and the network 40 offers video programs in the CATV service to the CATV terminals 44a, 44b and 44c. The network 40 is provided with an accounting unit 41, account controllers 42a, 42b and 42c respectively coupled to the CATV terminals 44a, 44b and 44c, and timers 43a, 43b and 43c respectively connected to the account controllers 42a, 42b and 42c. The network 40 is also provided with a well known unit, not shown in FIG. 1, for transmitting pictures in video programs requested by the CATV terminals to the CATV terminals.

For example, the CATV terminal 44a transmits a transmission request of a video program desired by a user to the network 40 along with channel information of the video program. When receiving the transmission request, the network 40 transmits pictures in the video program in the specified channel. When the network 40 starts to transmit the pictures in the video program requested by the CATV terminal 44a, the timer 43a is activated and starts to count a time. The account controller 42a determines whether or not a channel changing information transmitted from the CATV terminal 44a is received before the timer 43a reaches n sec. (e.g. 300 sec.). When the account controller 42a receives the channel changing information, the timer 43a is reset and stars to count a time again. When the timer 43a reaches m sec. (e.g. 240 sec.) smaller than n sec. (m<n) without receipt of the channel changing information, the account controller 43a transmits a notice signal so as to inform the user of the CATV terminal 44a that the account operation will start soon. When the CATV terminal 44a receives the notice signal, for example, a notice lamp provided therein is turned on. After this, when the timer 43a reaches n sec. without receipt of the channel changing information, a start signal is supplied from the account controller 42a to the accounting unit 41. The accounting unit 41 then starts the accounting operation. The account controller 42a transmits account start information to the CATV terminal 44a.

In a case where the B-ISDN is used for offering video programs in the CATV service, various information may be transmitted between the B-ISDN and terminals in an ATM (Asynchronous Transfer Mode). In this case, functions for counting time and for transmitting the notice signal informing that the accounting operation will start soon, and other functions regarding the accounting operation must be added to the B-ISDN. As the number of subscriber in the B-ISDN is very large, the load, in the B-ISDN, concerning the accounting operation is increased.

SUMMARY OF THE INVENTION

Accordingly, a general object of the present invention is to provide an accounting system in a network for offering video programs in which the disadvantages of the aforementioned prior art are eliminated.

A more specific object of the present invention is to provide an accounting system in a network for offering video programs in which accounting system the load regarding the accounting operation can be decreased in the network, for example, in the B-ISDN.

The above objects of the present invention are achieved by an accounting system in a network offering video programs to a plurality of subscriber terminals coupled thereto, the accounting system comprising: timer means, provided in each of the subscriber terminals, for counting a time, the timer means starting the counting operation when each of the subscriber terminals receives a video program offered from the network; determination means, provided in each of the subscriber terminals, for determining whether or not a count time in the timer means has reached a first reference value; start means, provided in each of the subscriber terminals, for transmitting account starting information to the network when the determination means determines that the count time in the timer means has reached the first reference value; termination means, provided in each of the subscriber terminals, for transmitting account termination information to the network when a subscriber terminal discontinues receipt of the video program; and accounting means, provided in the network, for performing an accounting process, with respect to each of the subscriber terminals from which the account starting information and the account termination information are transmitted, the accounting process starting from a time at which the network receives the account starting information and ending at a time at which the network receives the account termination information.

According to the present invention, as the account starting information and the account termination information are supplied from each of the subscriber terminals to the network, the amount of processing performed in the network can be decreased. That is, the load regarding the accounting operation can be decreased in the network, for example, in the B-ISDN.

Additional objects, features and advantages of the present invention will become apparent from the following detailed description when read in conjunction with the accompanying drawings.

DESCRIPTION OF THE PREFERRED EMBODIMENT

A description will now be given of the principle of an embodiment of the present invention with reference to FIG. 2.

Figure 1:
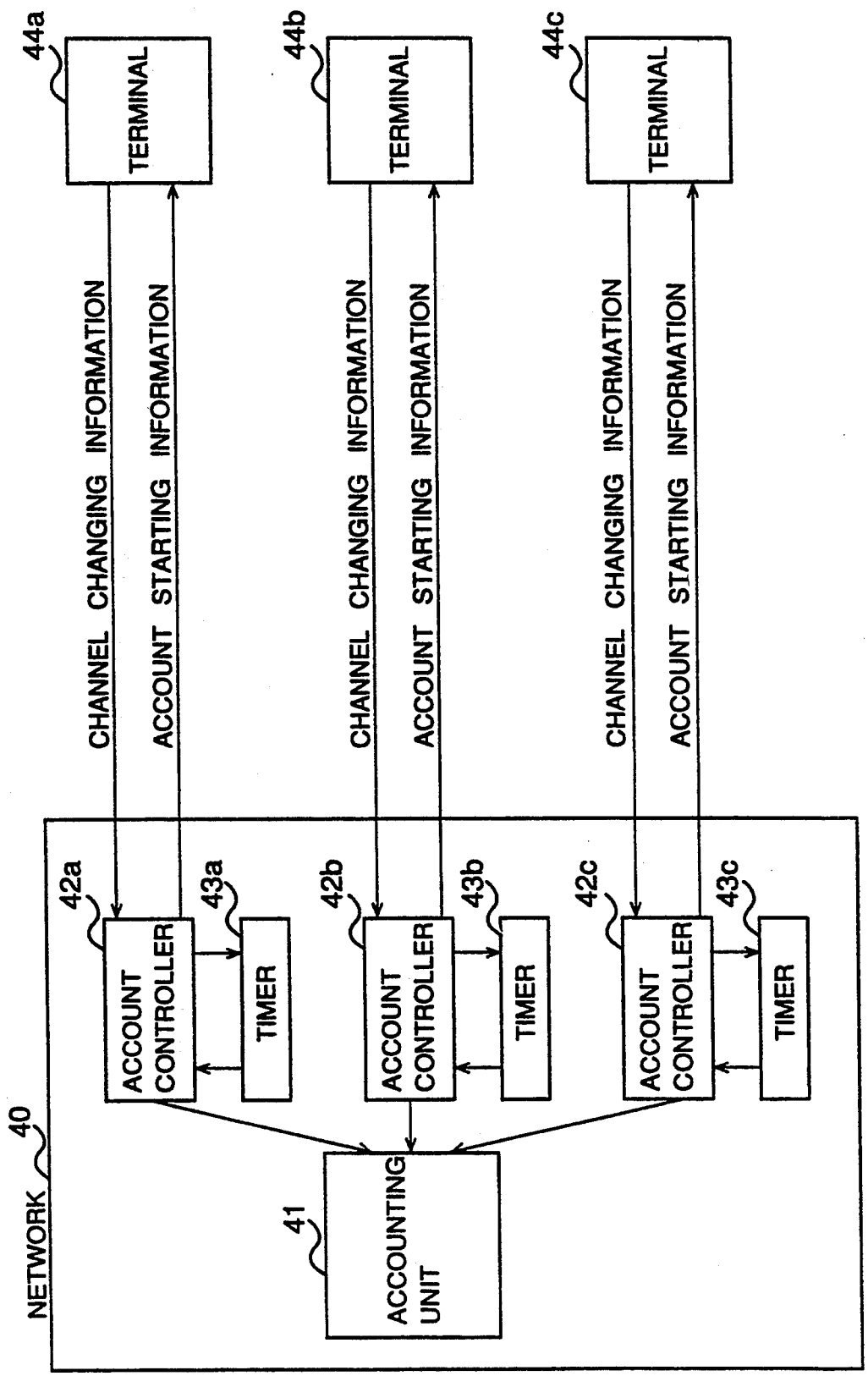
FIG. 1 is a block diagram illustrating a conventional accounting system.
Figure 2:
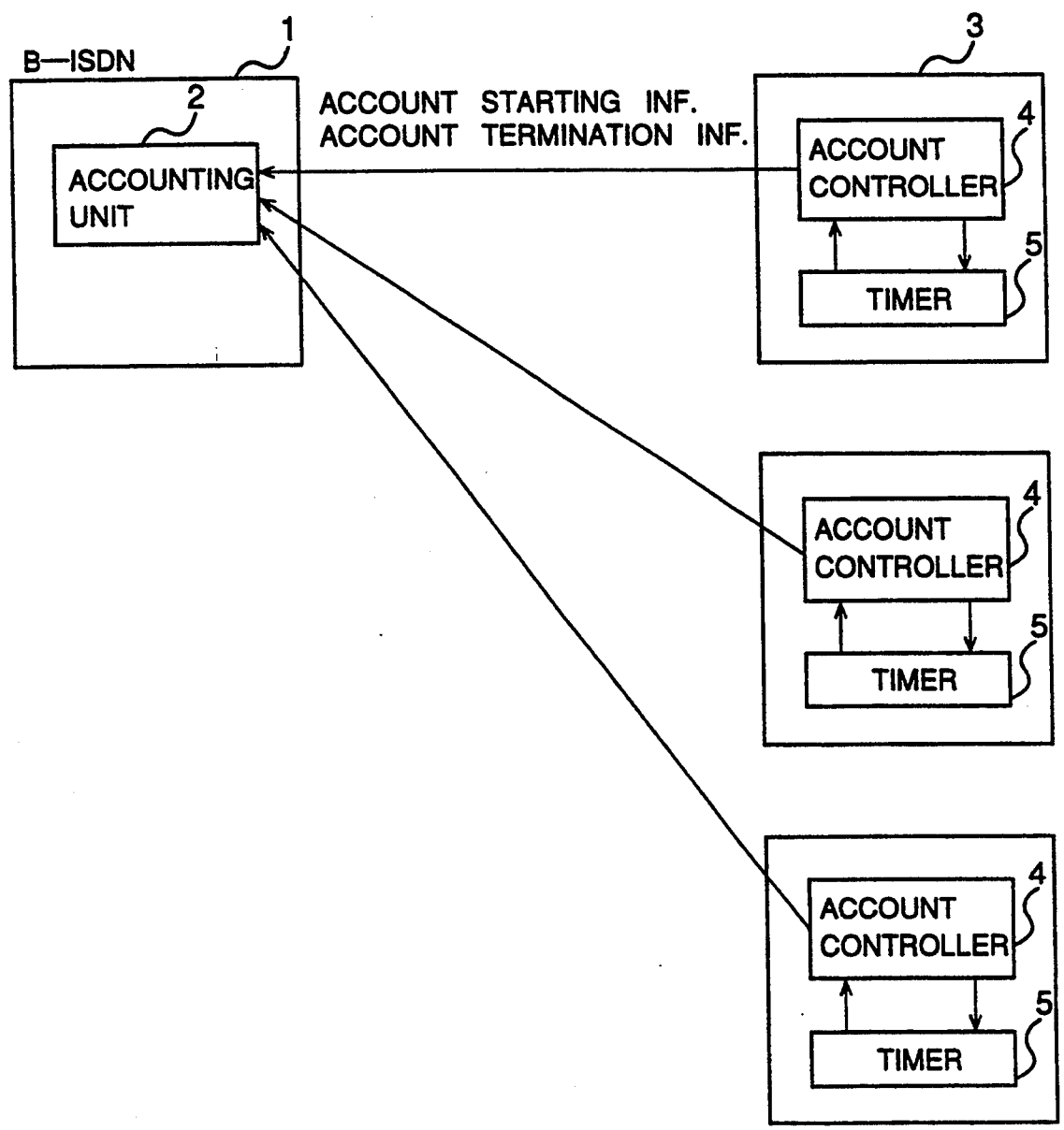
FIG. 2 is a block diagram illustrating a principle of an example of the present invention.

Referring to FIG. 2, a plurality of subscriber terminals 3 are coupled to a B-ISDN 1. Each of the subscriber terminals 3 is provided with an accounting controller 4 and a timer 5 connected to the accounting controller 4. The B-ISDN 1 is provided with an account unit 2. In each of the subscriber terminals 3, a user carries out an operation for changing the channel of the video program offered by the B-ISDN 1, the account controller 4 activates the timer 5 so that the timer 5 starts to count time. When the account controller 4 determines that the timer 5 has reached m sec. (e.g. 240 sec.) without the channel of the video program being changed by the user, the notice lamp provided in a corresponding subscriber terminal is turned on. After this, when the account controller 4 determines that the timer 5 has reached n sec. (e.g. 300 sec.) greater than the m sec. without the channel being changed by the user, the account controller 4 outputs account starting information. The account starting information is transmitted to the B-ISDN 1. The accounting unit 2 in the B-ISDN 1 receives the account starting information and then starts the accounting operation. When the user carries out an operation for stopping receipt of pictures in the video program or an operation for changing the channel of the video program, the account controller detects the operation and outputs account termination information. The account termination information output from the account controller 4 is transmitted to the B-ISDN 1, and then the accounting unit 2 stops the accounting operation. That is, the accounting operation is carried out in the B-ISDN 1 only from a time at which the account starting information is received to a time at which the account termination information is received.

A description will now be given of the embodiment of the present invention.

Figure 3:
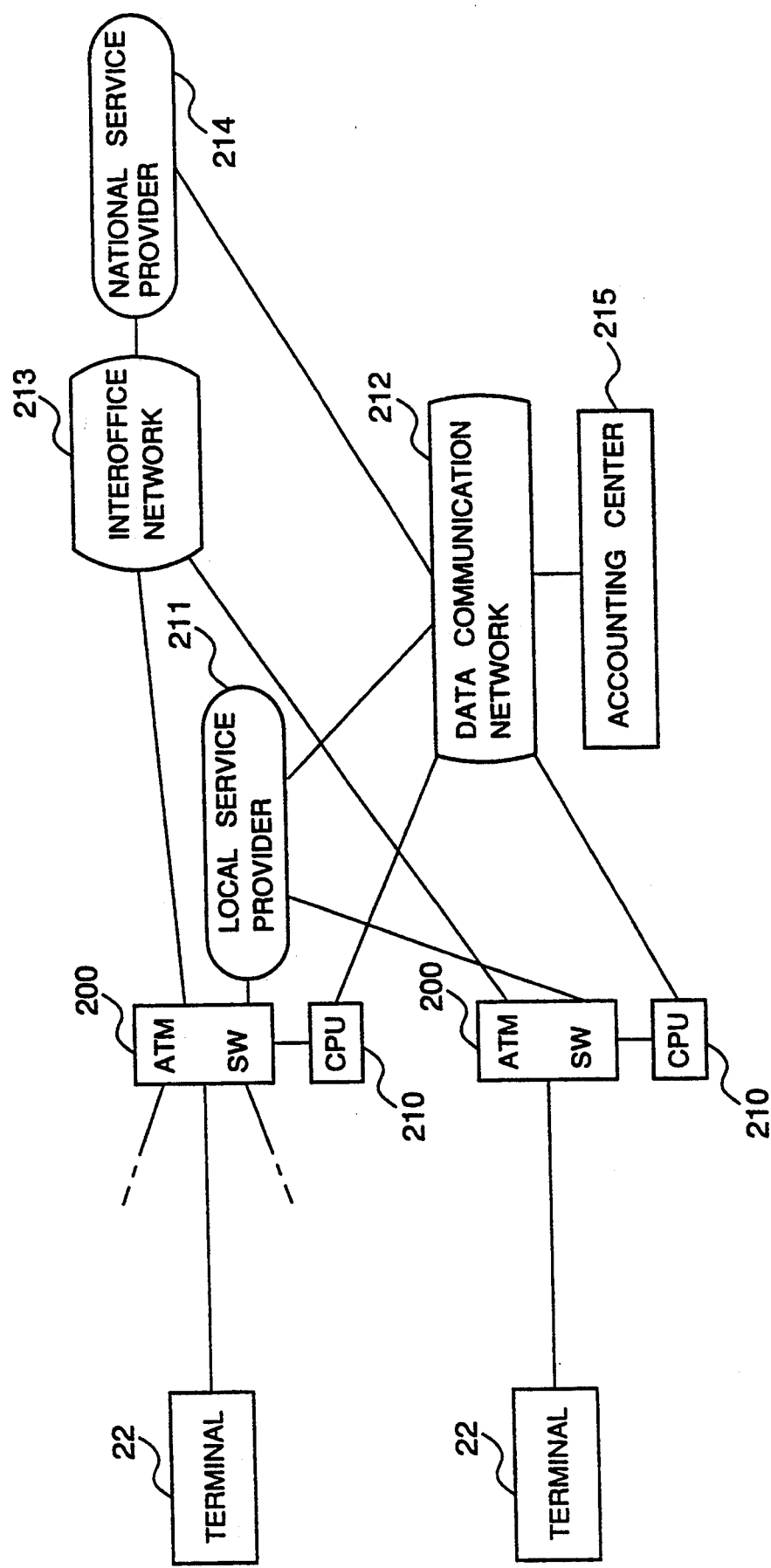
FIG. 3 is a block diagram illustrating an example of a whole structure of the B-ISDN.

A whole structure of the B-ISDN is shown in FIG. 3. Referring to FIG. 3, the B-ISDN is provided with ATM (Asynchronous Transfer Mode) switches 200 for switching ATM cells, processors 210 connected to the ATM switches 200, a local service provider 211, a data communication network 212, an interoffice network 213, a national service provider 214 and an accounting center 215 for performing accounting operations with respect to various services. A plurality of subscriber terminals 22 are connected to the ATM switches 200 in the B-ISDN by transmission paths formed, for example, of optical fibers.

Figure 4:
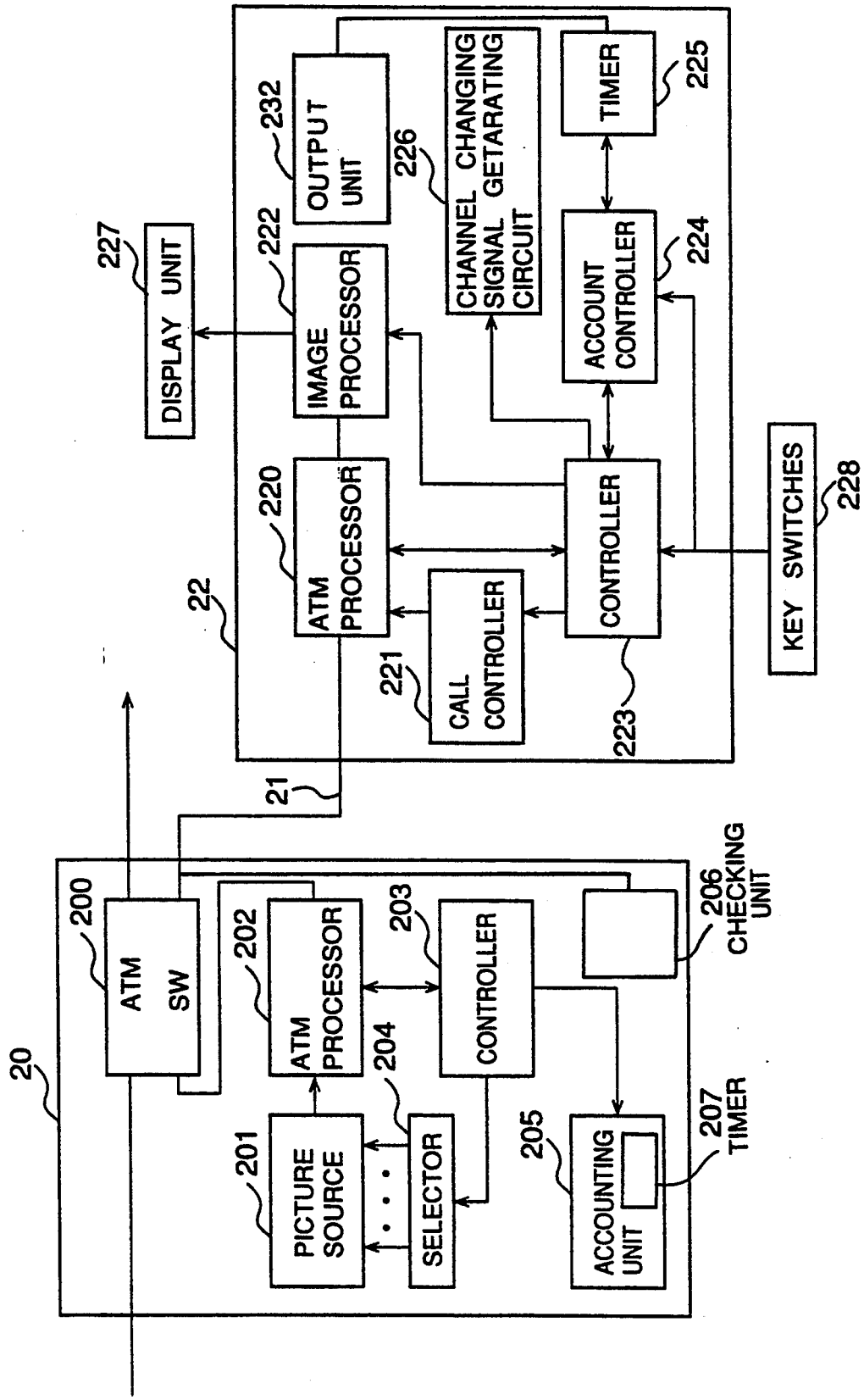
FIG. 4 is a block diagram illustrating an accounting system according to the embodiment of the present invention.

An accounting system according to the embodiment of the present invention is constituted as shown in FIG. 4. while only one subscriber terminal 22 is coupled to a network unit of the B-ISDN in FIG. 4, a plurality of subscriber terminals may be actually coupled to the network unit. A plurality of display units may be connected to the termination port of one transmission path so that received pictures are displayed by the display units in parallel. In FIG. 4, only essential parts of the network unit and each subscriber terminal are indicated, and other well known parts (e.g. an photoelectric mutual conversion unit) are omitted from FIG. 4.

Referring to FIG. 4, a subscriber terminal 22 is coupled to a network unit 20 of the B-ISDN by a transmission path 21 formed of optical fibers. The network unit 20 offers video programs to the subscriber terminal 22 in the CATV service. The network unit 20 is provided with an ATM switch 200, a picture source 201, an ArM processor 202, a controller 203, a selector 204 and an accounting unit 205. The ATM switch switches ATM cells. The picture source 201 outputs picture information (digital signals) in various types of video programs (supplied from a television broadcasting, a television camera, a video tape recorder (VTR) and the like). The ATM processor 202 converts picture information in the video program selected from the picture source 201 into ATM cells, each cell having a header of 5 bytes and an information field of 48 bytes. The selector 204 selects video programs from the picture source 201. Picture information in the video programs selected by the selector 204 is output from the picture source 201. The accounting unit 205 carries out an accounting operation and stores accounting information. The controller 203 is connected to the ATM processor 202, the selector 204 and the accounting unit 205. The controller 203 communicates with the subscriber terminal 22 so as to transmit/receive control signals and control information regarding channel selection and accounting in accordance with the request from the subscriber terminal 22. The controller also controls the selector 204 and the accounting unit 205. A checking unit 206 checks whether or not each of the subscriber terminals normally transmits the account starting information and/or the account termination information. The accounting unit 205 includes a timer 207 which is activated while the account information is being received.

The subscriber terminal 22 is provided with an ATM processor 220, a call controller 221, an image processor 222, a controller 223, an account controller 224, a timer 225 and a channel changing signal generating circuit 226. The ATM processor 220 forms ATM cells of picture information and control information and converts ATM cells into original digital signals. The call controller 221 communicates with the network unit 20 so as to transmit/receive call control information, control information of channel changing requests and the like. The image processor 222 carries out processes for displaying received pictures. The controller 223 communicates with the network unit 20 and controls parts of the subscriber terminal 22. The accounting controller 224 carries out an accounting control process in the subscriber terminal 22. The channel changing signal generating circuit 226 is controlled by the controller 223 and outputs a channel changing signal when the channel of the video program is changed. A display unit 227 is connected to the image processor 222, and displays pictures in the selected video programs. Key switches 228 are coupled to the controller 223 and the accounting controller 224, and are operated so as to change the channel of the video program and so as to input various information for the accounting. An output unit 232 outputs information that the accounting operation will start soon when it is determined that the count time in the timer 225 has reached a second reference value, as will be explained in detail below.

Figure 5:
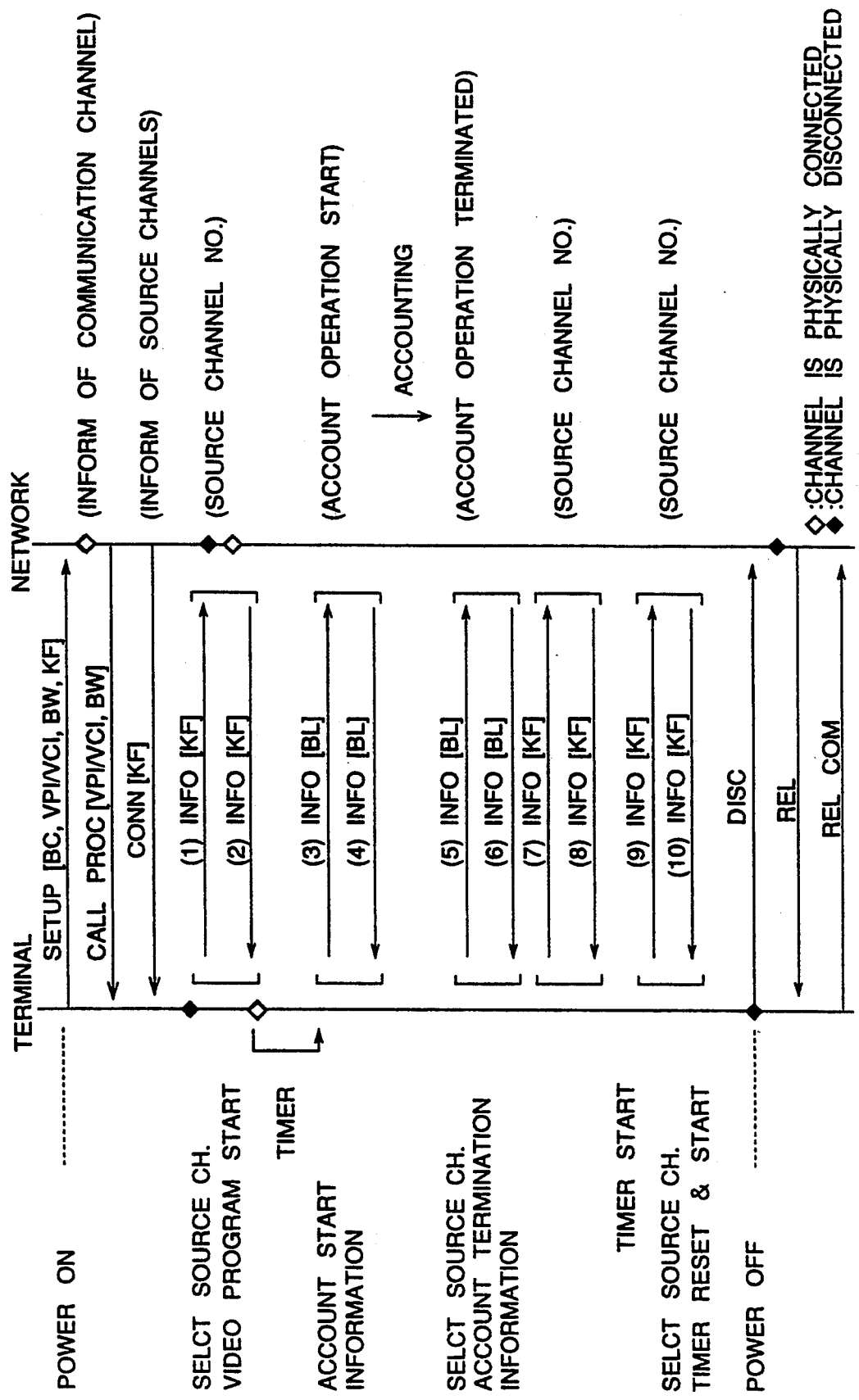
FIG. 5 is a diagram illustrating procedures performed between a network unit and a subscriber terminal.

The communications between the subscriber terminal 22 and the network unit 20 are performed in accordance with procedures shown in FIG. 5.

Referring to FIG. 5, when power supply of the subscriber terminal 22 is turned on, a setup message (SETUP) is transmitted from the subscriber terminal to the network unit 20. The setup message (SETUP) includes information regarding bearer capability (hereinafter simply referred to as BC), VPI/VCI identification (hereinafter simply referred to as VPI/VCI), bandwidth information (hereinafter simply referred to as BW) and keypad facility information (hereinafter simply referred to as KF). When the network unit 20 receives the setup message, the network unit 22 is connected to a predetermined control channel and transmits a call procedure message (CALL PROC) via the control channel. The call procedure message (CALL PROC) includes VPI/VCI and BW. Then the network unit 20 transmits a connection message (CONN) including KF. At this time, the network unit 20 informs the subscriber terminal 22 of source channels specifying video programs capable of being selected by the subscriber terminal 22. After this, the control channel is released from communication between the network unit 20 and the subscriber terminal 22. An operator performs an operation for selecting a video program, and a source channel corresponding to the selected video program is input from the key switches 228 to the controller 223 of the subscriber terminal 22. The source channel number is transmitted from the subscriber terminal 22 to the network unit 20 along with transmission request information ((1)INFO [KF]). When receiving the source channel number, the network unit 20 recognizes the video program specified by the received source number. That is, the selector 204 in the network unit 20 selects the video program specified by the received source number, and the picture source 201 outputs picture information in the selected video program. Then the picture information is transmitted from the network unit 20 to the subscriber terminal ((2)INFO [KF]) via a predetermined communication channel. The picture information received by the ATM processor 220 in the subscriber terminal 22 is supplied to the image processor 222. The picture information is processed by the image processor 222 and is supplied from the image processor 222 to the display unit 227. As a result, the pictures in the selected video program are displayed on the display unit 227. When the controller 223 of the subscriber terminal 22 detects picture information via the ATM processor 220, the account controller 224 is activated, so that a process is carried out in accordance with a flow chart shown in FIG. 6 in the subscriber terminal 22.

Figure 6:
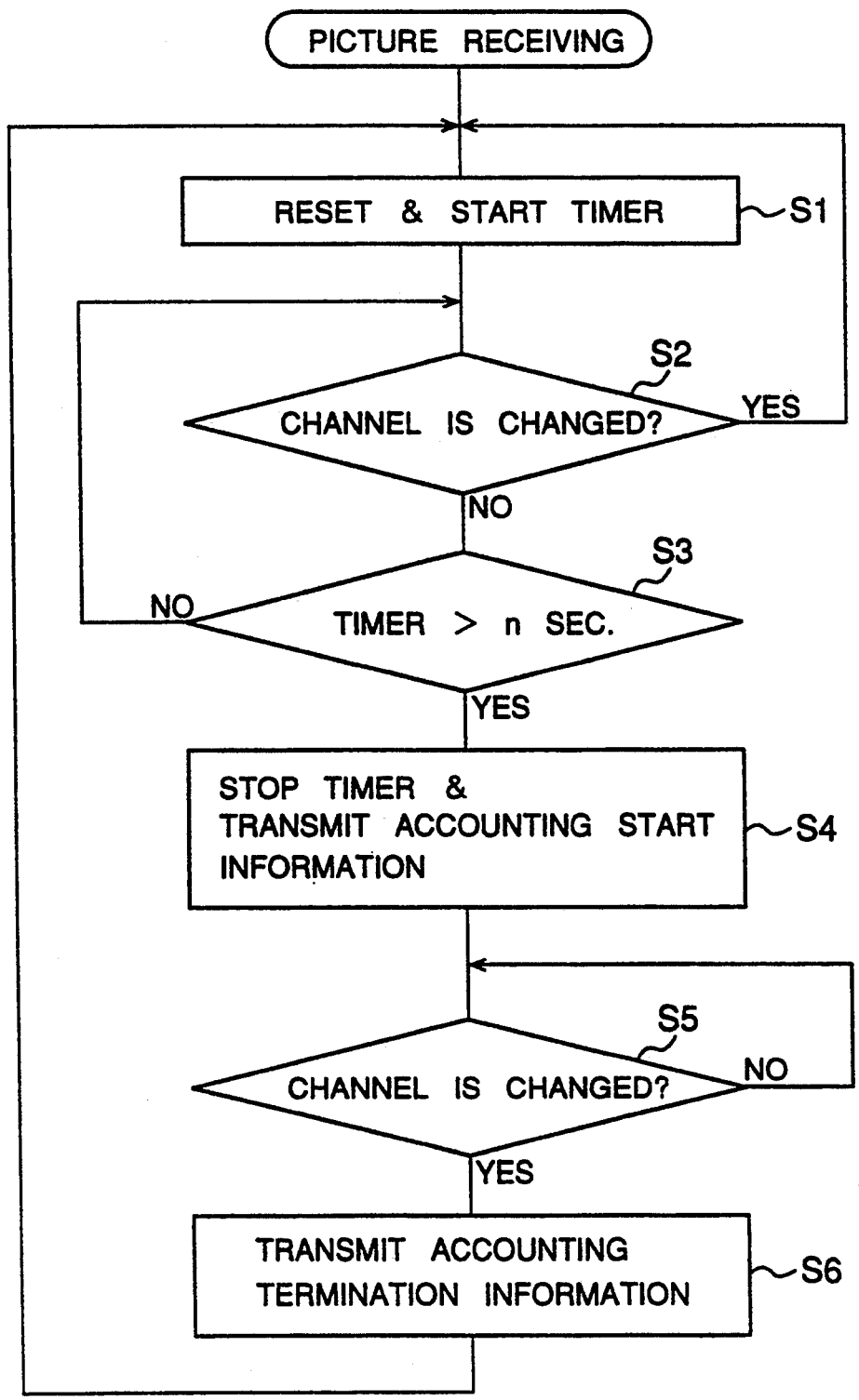
FIG. 6 is a flow chart illustrating an accounting operation performed in each subscriber terminal.
Figure 6A:
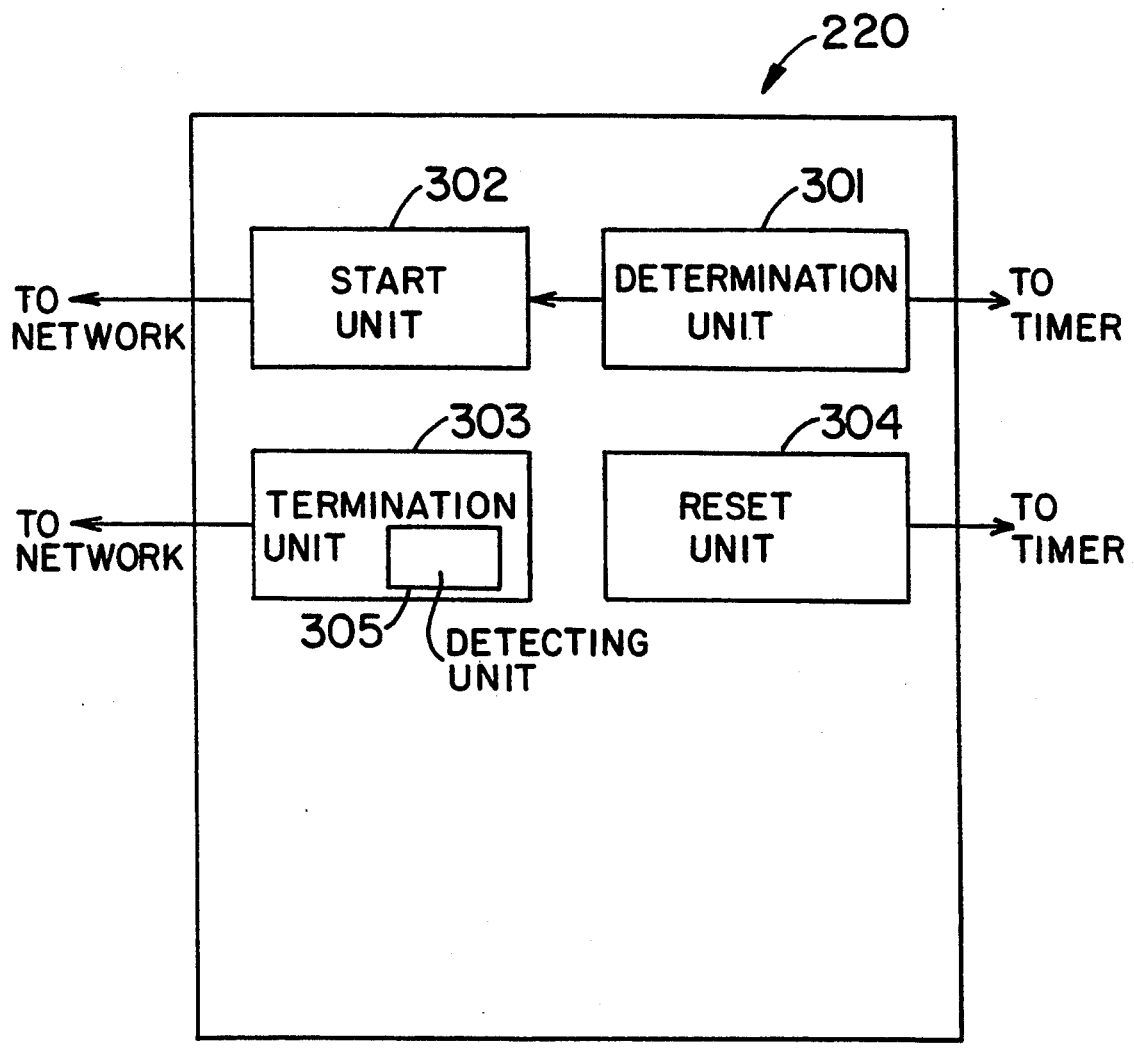
FIG. 6A diagrammatically shows an account controller of each subscriber terminal.

Referring to FIG. 6, the timer 225 is reset and starts to count a time in step S1. The account controller 224 then determines whether or not the operator operates the key switches 228 to change the channel of the video program in step S2 and whether or not the timer 225 has reached n sec. (e.g. 300 sec.). In a case where the account controller 224 determines that the timer 225 has reached n sec. without registering an operation for changing the channel of the video program in step S3, the account controller 224 makes the timer 225 stop counting a time and outputs the account starting information in step S4. The account starting information is supplied to the ATM processor 220 via the controller 223. The ATM processor 220 transmits the account starting information to the network unit 20 (see (3)INFO [BL] in FIG. 5). FIG. 6A diagrammically shows the account controller 224 of FIG. 4, which includes a determination unit 301 corresponding to step S3, a start unit 302 connected thereto and corresponding to step S4 in FIG. 6, unit 304 (step S1) connected to the timer 225 shown in FIG. 4 and a termination unit 303 corresponding to step S6 of FIG. 6. A detecting unit 305 corresponding to step S5 of FIG. 6 is provided in the termination unit 303.

Figure 7:
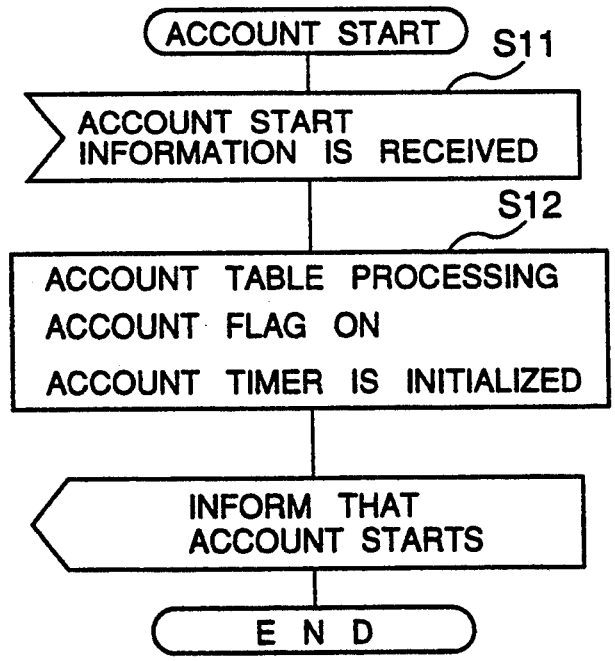
FIGS. 7, 8, and 9 are flow charts illustrating an accounting operation performed in the B-ISDN.
Figure 10:
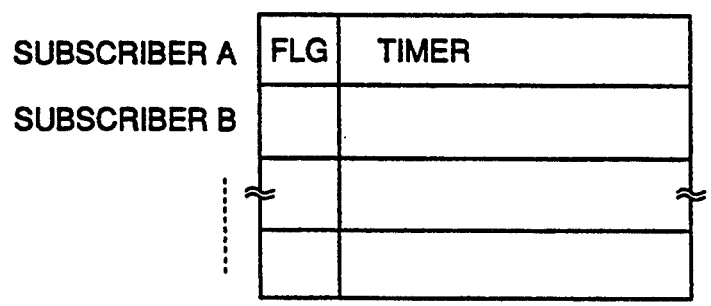
FIG. 10 is a diagram illustrating an accounting table.

When the network unit 20 receives the account starting information transmitted from the subscriber terminal 22, the controller 203 activates the accounting unit 205. Then, the accounting unit 205 in the network unit 20 carries out a preprocessing in accordance with a flow chart as shown in FIG. 7. Referring to FIG. 7, when the account starting information is received in step S11, the accounting unit 205 performs an accounting table process in step S12. In the accounting table process, an accounting flag corresponding to the subscriber terminal 22 that has output the account starting information is turned on and an account timer is initialized in an accounting table as shown in FIG. 10. After the above preprocessing, the accounting unit 205 starts the accounting operation. When the accounting unit 205 starts the accounting operation, the network unit 20 informs the subscriber terminal 22, in step S31, that the accounting operation has started (see (4)INFO [BL] in FIG. 5).

Figure 8:
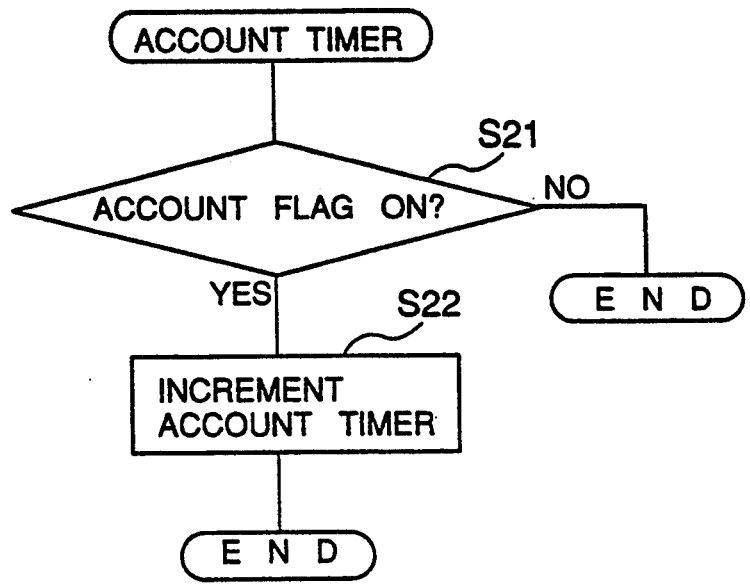

The accounting operation is performed in accordance with a flow chart as shown in FIG. 8. A process shown in FIG. 8 is repeatedly performed at predetermined intervals. Step S21 determines whether or not the accounting flag corresponding to the subscriber terminal 22 is turned on with reference to the accounting table shown in FIG. 10. When the result obtained by step S21 is YES, step S22 increments the account timer in the accounting table by one. As the above process shown in FIG. 8 is repeated, the value of the account timer in the accounting table corresponds to an accounting time.

After the account starting information is transmitted from the subscriber terminal 22 to the network unit 20, the account controller 224 in the subscriber terminal 22 checks, in step S5 shown in FIG. 6, whether or not the operation for changing the channel of the video program has been performed. When the channel of the video program has been changed, the account controller 224 outputs account termination information in step S6. The account termination information is supplied to the ATM processor 220 via the controller 223. The ATM processor 220 transmits the account termination information to the network unit 20 (see (5)INFO [BL] in FIG. 5).

Figure 9:
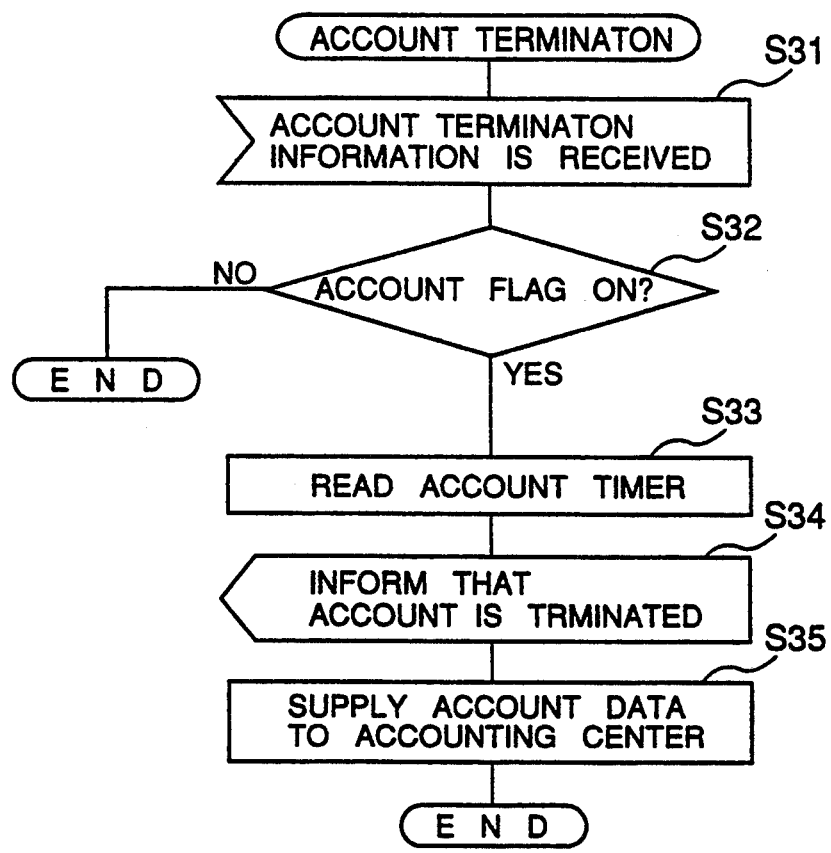

When the network unit 20 receives the account termination information transmitted from the subscriber terminal 22, the accounting unit 205 in the network unit 20 carries out a preprocessing in accordance with a flow chart as shown in FIG. 9. Referring to FIG. 9, when the account termination information is received in step S31, the account controller 224 determines, in step S32, whether or not the accounting flag corresponding to the subscriber terminal 22 which has output the account termination information is turned on with reference to the account table. When the result obtained in step S32 is YES, the account controller 224, in step S33, reads out the value of the account timer corresponding to the subscriber terminal 22 from the account table. After this, the network unit 20 informs the subscriber terminal 22, in step S34, that the accounting operation is terminated (see (6)INFO [BL] in FIG. 5). Then, in step S35, the account controller 224 supplies to the accounting center (not shown in FIG. 4), as an accounting value, the value read out from the account table. At this time, the accounting flag corresponding to the subscriber terminal 22 that has output the account termination information is turned off in the account table.

On the other hand, when the result obtained in step S32 is NO, the process is terminated and the network unit 20 recognizes that the subscriber terminal 22 is in an unusual state.

Returning to FIG. 5, when the subscriber terminal 2 is informed that the accounting process is terminated, the source channel number specifying a new requested video program is transmitted from the subscriber terminal 22 to the network unit 20 along with transmission request information ((7) INFO [KF]). When receiving the source channel number, the selector 204 in the network unit 20 selects the video program specified by the received source channel number, and the picture source 201 outputs picture information in the new selected video program. Then, the picture information is transmitted from the network unit 20 to the subscriber terminal ((8)INFO [KF]) via a predetermined communication channel. The picture information received by the ATM processor 220 in the subscriber terminal 22 is supplied to the image processor 222. The picture information is processed by the image processor 222 and is then supplied from the image processor 222 to the display unit 227. As a result, the pictures in the new selected video program are displayed on the display unit 227.

In the subscriber terminal 22, after the account termination information is transmitted, the timer 225 is reset and starts to count time again in step S1 shown in FIG. 6. Then, steps S2 and S3 are repeated again. In a case where it is determined that the timer 225 reaches n sec. without the channel of the video program being changed, the process returns to step S1. At this time, the new source channel number is transmitted from the subscriber terminal 22 to the network unit 20, and the communication between the network unit 20 and the subscriber terminal 22 is performed in the same manner as in the above case (see (9)INFO [KF] and (10)INFO [KF] in FIG. 5).

After this, in the subscriber terminal 22, steps S2 and S3 are repeated again. Then, if the power supply of the subscriber terminal is turned off before the timer 225 reaches n sec., control communication (DISC [disconnect], REL [release] and REL COM [release complete] in FIG. 5) are performed between the network unit 20 and the subscriber terminal 22, so that the network unit 20 and the subscriber terminal 22 are disconnected from the communication path 21 and released from the communication channel.

Steps for informing the user of the subscriber terminal 22 that the accounting operation will start soon can be added to the process shown in FIG. 6. That is, after step S2, a first added step for determining whether or not the timer 225 has reached m sec. (e.g. 240 sec.) less than n sec., and a second added step are performed. In the second added step, a message that the accounting operation will start soon is displayed on the display unit 227 so that the message is supperimposed on the pictures of the video program. After the second added step, step s3 shown in FIG. 6 is carried out.

Figure 11:
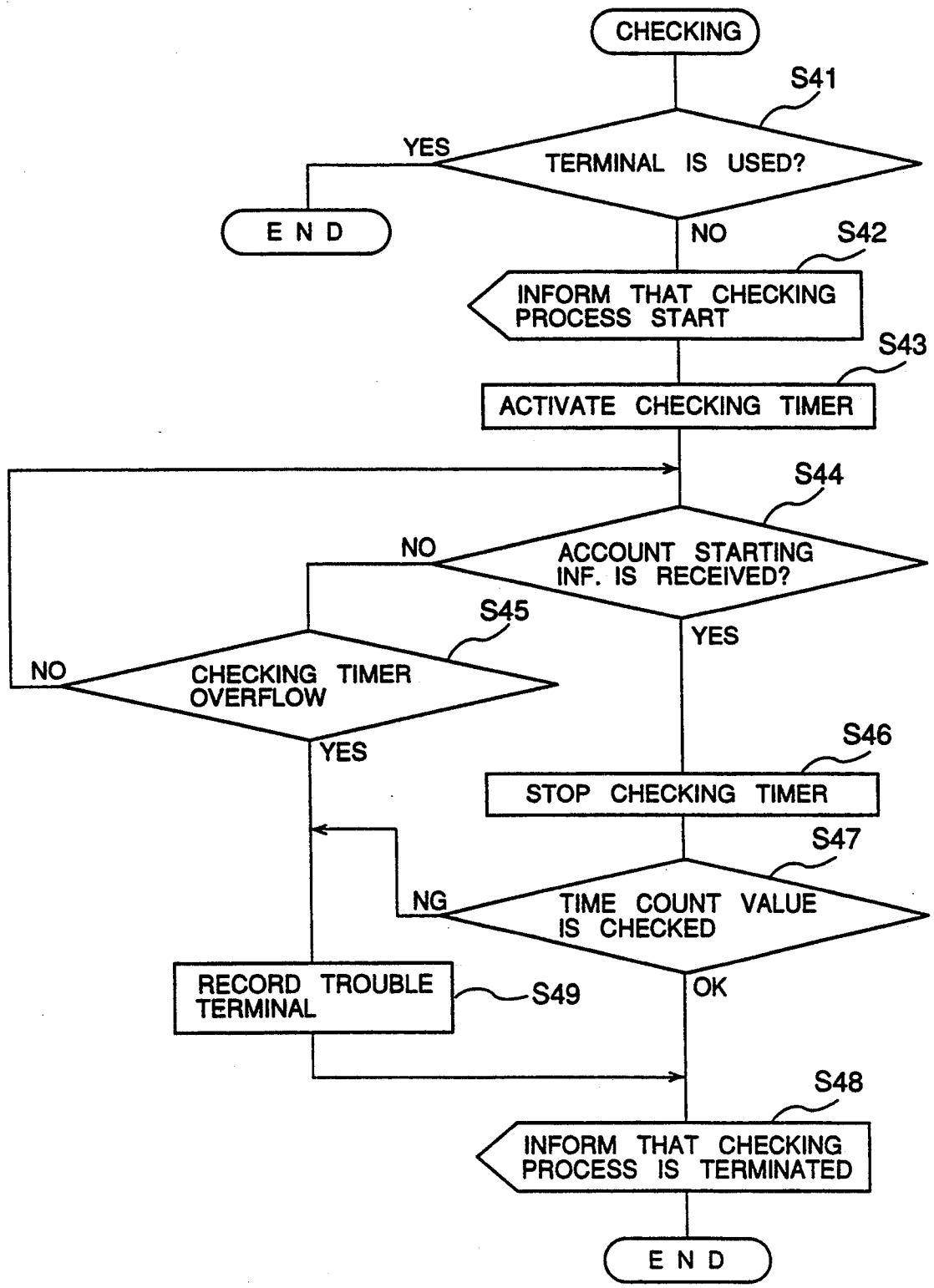
FIG. 11 is a flow chart illustrating a testing operation for checking unfairness regarding the account in each subscriber station.

In this embodiment, the network unit 20 checks whether or not the account start information and/or the account termination information are unfairly being supplied from the subscriber terminal in accordance with a checking process as shown in FIG. 11. Referring to FIG. 11, in step S41, the network unit 20 determines whether or not each of subscriber terminals is used for communication. After informing each subscriber terminal not being used for communication that a checking process will start, in step S42, a checking timer is activated so as to start to count a time in step S43. After this, the network unit 20, in step S44, determines whether or not the account starting signal transmitted from each subscriber terminal is received.

In each subscriber terminal which is informed that the checking process will start, the channel changing signal generating circuit 226 is activated so that a dummy channel changing signal is output therefrom. The account controller 224 outputs the account starting information in response to the dummy channel changing signal. Then the account starting information is transmitted from each subscriber terminal to the network unit 20.

In the network unit 20, in step S45, it is determined whether or not the checking timer overflows until the account starting information is received. When the account starting information from a subscriber terminal is received, the checking timer stops counting a time in step S46. Then, it is checked whether or not the count time in the checking timer is within a normal range. When the count time in the checking timer is within the normal range, the network unit 20 informs the subscriber terminal that the checking operation is terminated. On the other hand, when either the checking timer overflows (step S45) or the count time in the checking timer exceeds the normal range, the subscriber terminal is recorded, in step S49, as terminal in which trouble has occurred or in which unfair operations have been performed.

In the above checking process, it can be determined, based on the account termination information, whether or not each subscriber terminal is operating normally.

The present invention is not limited to the aforementioned embodiments, and variations and modifications may be made without departing from the scope of the claimed invention.

What is claimed is:

1. An accounting system in a network offering video programs to a plurality of subscriber terminals coupled thereto, said accounting system comprising:

first timer means, provided in each of said subscriber terminals, for counting a time, said first timer means starting to count a time when a subscriber terminal receives a video program offered from said network;

an account controller provided in each of said subscriber terminals and including:

determination means for determining whether or not a count time in said first timer means has reached a first reference value, start means for transmitting account starting information to said network when said determination means determines that the count time in said first timer means has reached the first reference value, and termination means for transmitting account termination information to said network when the subscriber terminal discontinues receipt of the video program; and accounting means, provided in said network, for performing an accounting process with respect to each of said subscriber terminals from which the account starting information and the account termination information are transmitted, the accounting process starting from a time at which said network receives the account starting information and ending at a time at which said network receives the account termination information.

2. An accounting system as claimed in claim 1, wherein said account controller further comprises:
reset means, coupled to said first timer means provided in each of said subscriber terminals, for initializing said first timer means when a channel of the video program received by each of said subscriber terminals has been changed before said first determination means determines that the count time in said first timer means has reached the first reference value, said first timer means being initialized by said reset means so as to restart to count the time count.

3. An accounting system as claimed in claim 1, wherein said termination means includes detecting means for detecting whether or not a channel of the video program received by each of said subscriber terminals has been changed, said termination means transmitting the account termination information to said network when said detecting means detects that the channel of the video program received by the subscriber terminal has been changed.

4. An accounting system as claimed in claim 1, wherein said accounting means provided in said network has second timer means for counting a time, said second timer being activated from the time at which the account starting information is received until the time at which the account termination information is received.

5. An accounting system as claimed in claim 4, wherein said second timer means has means for incrementing a time count value by one at predetermined intervals.

6. An accounting system as claimed in claim 1, wherein said account controller determines whether or not a count time in said first timer means has reached a second reference value less than the first reference value; and each subscriber terminal includes
output means for outputting information that the accounting operation will start soon when it is determined that the count time in said first timer means has reached the second reference value.

7. An accounting system as claimed in claim 1, wherein said network further comprises:
checking means for checking whether or not each of said subscriber terminals normally transmits the account starting information and/or the account termination information.

8. An accounting system as claimed in claim 1, wherein said network is a B-ISDN (Broad band Integrated Services Digital Network).

9. A terminal coupled to a network offering video programs to said terminal, said terminal comprising an account controller; and
timer means for counting a time, said timer means starting to count time when said terminal receives a video program offered from said network;
said account controller including:
determination means, coupled to said timer means, for determining whether or not a count time in said timer means has reached a first reference value;
start means, coupled to said determination means, for transmitting account starting information to said network when said determination means determines that the count time in said timer means has reached the first reference value;
termination means for transmitting account termination information to said network when said terminal discontinues receipt of the video program, wherein said network performs an accounting process, with respect to said terminal from which the account starting information and the account termination information are transmitted, the accounting process starting from a time at which said network receives the account starting information until a time at which said network receives the account termination information.

10. A terminal as claimed in claim 9, wherein said account controller further comprises:
reset means for initializing said timer means when a channel of the video program received by said terminal is changed before said determination means determines that the count time in said timer means has reached the first reference value, said timer means being initialized by said reset means so as to restart the time count.

11. A terminal as claimed in claim 9, wherein said termination means includes detecting means for detecting whether or not a channel of the video program received by said terminal has been changed, said termination means transmitting the account termination information to said network when said detecting means detects that the channel of the video program received by said terminal has been changed.

12. A terminal as claimed in claim 9, wherein said account controller determines whether or not a count time in said timer means has reached a second reference value less than the first reference value; and the terminal further comprises:
output means for outputting information that the accounting operation will start soon when it is determined that the count time in said timer means has reached the second reference value.

13. A method for performing an accounting process in a network offering video programs to a plurality of subscriber terminals coupled thereto, said method comprising the steps of:
providing first timer means in each of said subscriber terminals, and counting a time starting when a subscriber terminal receives a video program offered from said network;
providing in each terminal an account controller having determination means and determining thereby whether or not a count time in said first timer means has reached a first reference value;
transmitting account starting information to said network when said determination means determines that the count time in said first timer means has reached the first reference value;
transmitting account termination information to said network when the subscriber terminal discontinues receipt of the video program; and
providing accounting means in said network, for performing an accounting process with respect to each of said subscriber terminals from which the account starting information and the account termination information are transmitted so that the accounting process starts from a time at which said network receives the account starting information and ends at a time at which said network receives the account termination information.

14. The method as claimed in claim 13, further comprising:

initializing said first timer means when a channel of the video program received by each of said subscriber terminals has been changed before said determination means determines that the count time in said first timer means has reached the first reference value so as to restart to count the time count.

15. The method as claimed in claim 13, further comprising detecting whether or not a channel of the video program received by each of said subscriber terminals has been changed, and transmitting the account termination information to said network when it is detected that the channel of the video program received by the subscriber terminal has been changed.

16. The method as claimed in claim 13, and further comprising:

determining whether or not a count time in said first timer means has reached a second reference value less than the first reference value; and outputting information that the accounting operation will start soon when it is determined that the count time in said first timer means has reached the second reference value.

17. The method as claimed in claim 13, and further comprising:

providing checking means in said network and checking whether or not each of said subscriber terminals normally transmits the account starting information and the account termination information.

* * * * *